United States Patent [19]

DeWitt

[11] Patent Number: 4,768,801
[45] Date of Patent: Sep. 6, 1988

[54] CHASSIS LOCK BETWEEN TOWING TRACTOR AND CHASSIS FOR CHASSIS HAVING TELESCOPING ARTICULATING STINGER

[75] Inventor: Nicklas R. DeWitt, Portola Valley, Calif.

[73] Assignee: X-Ten Corporation, San Francisco, Calif.

[21] Appl. No.: 42,992

[22] Filed: Apr. 27, 1987

[51] Int. Cl.$^4$ ............................................. B62D 53/06
[52] U.S. Cl. .................................... 280/404; 280/142; 280/432; 280/474
[58] Field of Search ........... 280/432, 474, 404, 405 A, 280/142, 145, 426, 442, 438 R, 482

[56] References Cited

U.S. PATENT DOCUMENTS

| 3,087,744 | 4/1963 | Tanenbaum | 280/404 |
|---|---|---|---|
| 3,788,672 | 1/1974 | Tharp | 280/404 |
| 3,837,678 | 9/1974 | Cicero | 280/432 |
| 3,972,540 | 8/1976 | Donaldson | 280/426 X |
| 3,972,542 | 8/1976 | Dirks et al. | 280/432 |
| 4,068,860 | 1/1978 | Meyers et al. | 280/432 |
| 4,226,436 | 10/1980 | Donaldson | 280/404 |
| 4,660,848 | 4/1987 | DeWitt | 280/404 |

Primary Examiner—John J. Love
Assistant Examiner—Charles R. Watts
Attorney, Agent, or Firm—Townsend and Townsend

[57] ABSTRACT

In a tractor towed chassis having a telescoping, articulated stinger, a two function locking mechanism is disclosed complementary to the non-articulating and articulating functions of the chassis. In the non-articulating function, the chassis hauls short containers, has the stinger telescoped to a non-articulating disposition and conventionally pivots with respect to the towing tractor at a fifth wheel. In the articulating function, the chassis extends to expose the articulated portion of the stinger, is locked at the forward portion to the towing tractor for articulation and when turning of the tractor relative to the chassis occurs the rear wheels turn to assist in turning of the tractor towed chassis. The locking mechanism has two discrete locks, a bolster lock that is engaged only when the chassis does not articulate and a fifth wheel lock that is engaged only when the chassis does articulate. The bolster lock extends between the fifth wheel portion of the chassis and the bolster and locks the bolster in parallel relation to the chassis when articulation of the chassis does not occur. The fifth wheel lock extends between the pin gathering surface on the fifth wheel of the towing tractor and the fifth wheel engagement portion of the chassis and locks the forward portion of the chassis to turn with the tractor. The bolster lock and the fifth wheel lock are interconnected to move together. In the non-articulating disposition of the chassis, the bolster lock is engaged and the fifth wheel lock is disengaged. In the articulating disposition of the chassis, the bolster lock is disengaged and the fifth wheel lock is engaged.

7 Claims, 4 Drawing Sheets

FIG. IA

CHASSIS LOCK BETWEEN TOWING TRACTOR AND CHASSIS FOR CHASSIS HAVING TELESCOPING ARTICULATING STINGER

BACKGROUND OF THE INVENTION

This invention relates to tractor towed chassis. Specifically it relates to a locking mechanism specifically designed for and useful with a telescoping articulated stinger chassis in which the rear wheel set assists in turning when long loads are loaded on the chassis.

STATEMENT OF THE PROBLEM

In my U.S. Pat. No. 4,660,848 issued on Apr. 28, 1987 entitled Chassis with Telescoping and Articulated Stinger. I disclose a chassis which telescopes between a short position and an extended position. In the short position, the chassis is conventional. It pivots about a fifth wheel on the towing tractor.

In the extended position, the telescoping member articulates. The articulation of the telescoping member and simultaneous pivot of forward and rearward bolsters enables the rear and towed wheels of the chassis to assist in turning of the rig.

In that invention, I disclosed a locking mechanism. The locking mechanism extends between the fifth wheel portion of the chassis and the frame of a towing tractor.

Unfortunately, towing tractors have differing frames. There is needed for a locking mechanism that is generic to all conventional tractors that may tow the chassis disclosed.

SUMMARY OF THE INVENTION

In a tractor towed chassis having a telescoping, articulated stinger, a two function locking mechanism is disclosed complementary to the non-articulating and articulating functions of the chassis. In the non-articulating function, the chassis hauls short containers, has the stinger telescoped to a non-articulating disposition and conventionally pivots with respect to the towing tractor at a fifth wheel. In the articulating function, the chassis extends to expose the articulated portion of the stinger, is locked at the forward portion to the towing tractor for articulation and when turning of the tractor relative to the chassis occurs the rear wheels turn to assist in turning the tractor towed chassis. The locking mechanism has two discrete locks, a bolster lock that is engaged only when the chassis does not articulate and a fifth wheel lock that is engaged only when the chassis does articulate. The bolster lock extends between the fifth wheel portion of the chassis and the bolster and locks the bolster in parallel relation to the chassis when articulation of the chassis does not occur. The fifth wheel lock extends between the pin gathering surface on the fifth wheel of the towing tractor and the fifth wheel engagement portion of the chassis and locks the forward portion of the chassis to turn with the tractor. The bolster lock and the fifth wheel lock are interconnected to move together. In the non-articulating disposition of the chassis, the bolster lock is engaged and the fifth wheel lock is disengaged. In the articulating disposition of the chassis, the bolster lock is disengaged and the fifth wheel lock is engaged.

Other Objects, Features and Advantages

An object of this invention is to disclose a universal locking mechanism between a towing tractor and chassis. According to this aspect of the invention, a fifth wheel lock is configured for engagement to the fifth wheel pin gathering groove at the rear of a chassis. The lock has a male member having the configuration of the fifth wheel pin gathering groove. The lock reciprocates to and from engagement with the groove for locking and unlocking the chassis for turning movement with the fifth wheel.

An advantage of this aspect of the invention is that the disclosed fifth wheel lock will fit virtually all towing tractors.

A further object of this invention is to disclose a bolster lock between a chassis and an overlying pivotal bolster. According to this aspect of the lock includes a fork with upwardly rotating tines. These tines rotate between a first position where the tines are below the bolster and permit pivotal movement of the bolster to a second position where the tines engage the bolster and lock the bolster from pivotal movement.

A further object of this invention is to interconnect the the bolster lock and the fifth wheel lock for cooperative movement to my telescoping and articulated chassis set forth and described in my U.S. Pat. No. 4,660,848 which issued Apr. 28, 1987. According to this aspect of the invention, the bolster lock and the fifth wheel lock are tied together for reciprocation between two positions. In a first position, the fifth wheel lock is locked to the fifth wheel while the bolster lock is disengaged leaving the bolster free to pivot with respect to the remainder of the chassis. In a second position of the locking mechanism, the bolster is locked in rigid and parallel relation to the chassis while the fifth wheel is unlocked and the chassis may be conventionally towed pivoting with respect to the fifth wheel.

Other objects, features and advantages of this invention will be more apparent after referring to the following specification and attached drawings in which:

FIG. 1A is an illustration of the chassis and locking mechanism of my invention being utilized to haul a relatively short container with the bolster lock engaged:

FIG. 1B has an illustration of the forward portion of the chassis with the container and towing tractor removed illustrating the bolster lock locking the bolster and fifth wheel engaging portion of the chassis rigidly together;

Referring to FIG. 1A, a tractor T is shown towing a container D. Container D is typically less than 45 feet in length. The tractor and the container D are both shown in broken lines so that the conventional disposition of the chassis can be illustrated.

A forward bolster F and a rearward bolster G are illustrated. These respective bolsters receive the corner casting fittings of the container D (not shown) and support the container on the chassis.

The chassis includes a fifth wheel engagement portion 12. a telescoping and articulating stinger S and a rear wheel set W.

In the illustration of FIG. 1A. bolster F is locked in parallel relationship to the fifth wheel portion of the chassis 20. At the same time and as illustrated, the chassis at the fifth wheel 12 is free to conventionally pivot behind the towing tractor T. The familiar conventional towed tractor and trailer configuration results.

Telescoping stinger is described in my U.S. Pat. No. 4,660,848 in complete detail. Such description will not be repeated here save and except to incorporate by reference that patent and the description contained therein.

Figure 1B:
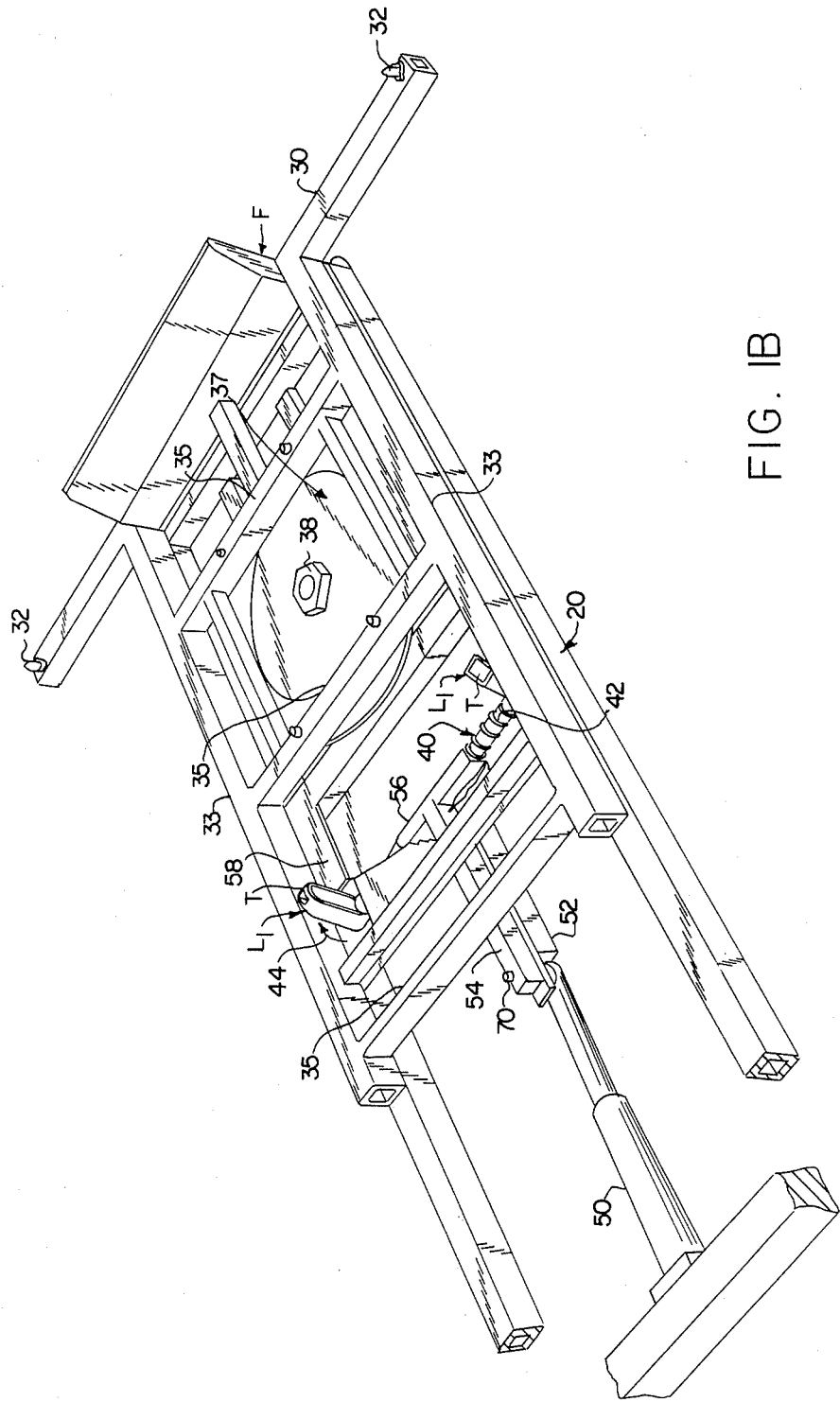

Having set forth the configuration of FIG. 1A, attention can now be devoted to FIG. 1B to illustrate the bolster lock L1 locking forward bolster F to the fifth wheel engagement portion 20 of the hassis C.

Referring to FIG. 1B, bolster F includes a frontal cross piece 30 having twist lock fittings 32 at either end. Twist lock fittings firmly engage the corner fittings on the container D and are conventional.

Bolster F includes paired side members 33 and cross members 35 which members together form a frame. Miscellaneous bracing is also included. Attached between forward frame members 35 is a pivot plate 37. Pivot plate 37 is provided with the pivot 38. It is this pivot that allows relative movement between bolster F and the fifth wheel engaging portion 20 of chassis C.

Locking member L1 is shown in a position of locking bolster F in parallel relation to the fifth wheel engaging portion 20 of chassis C. Specifically, a cross bar 40 has pair tines T at either end. Cross bar 40 is wound with coil spring 42. Coil spring 42 biases bar 40 to rotate tines T upwardly. Tines T when pivoted upwardly engage the inside edges of frame members 33. In such engagement, the bolster F is held in firm parallel braced relation with respect to the fifth wheel engaging portion 20 of the chassis C.

Bar 40 is mounted for reciprocal movement on bar 52 for towards and away from the forward end of the chassis C adjacent the forward portion of bolster F. Such movement occurs through an air cylinder 50 moving bar 52 and cross sleeve 54 which attaches about shaft 40 at cross member 56.

Immediately forward of tine T is plate 58. Plate 58 has the function of causing tine T to rotate out of engagement with bolster F at member 33 when cylinder 50 causes bar 40 to move forwardly. This can be seen with respect to FIG. 2B.

Figure 2A:
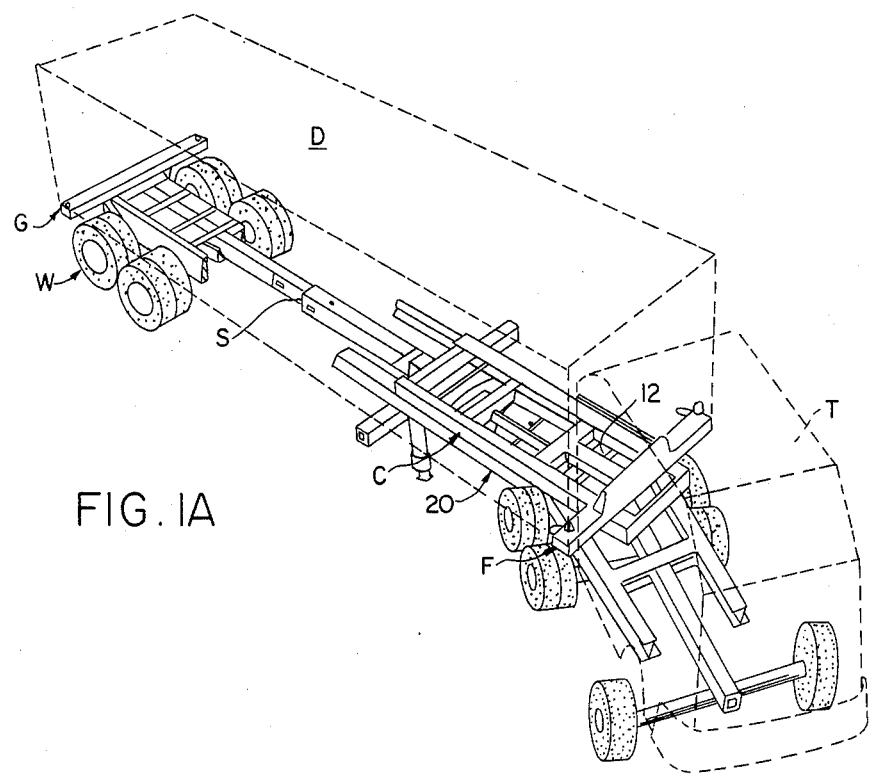
FIG. 2A is a view of the chassis of my invention hauling a long container with the outwardly telescoped stinger articulating to have the rear wheels participate in turning the rig and the fifth wheel lock engaged with the bolster lock disengaged.
Figure 2A:
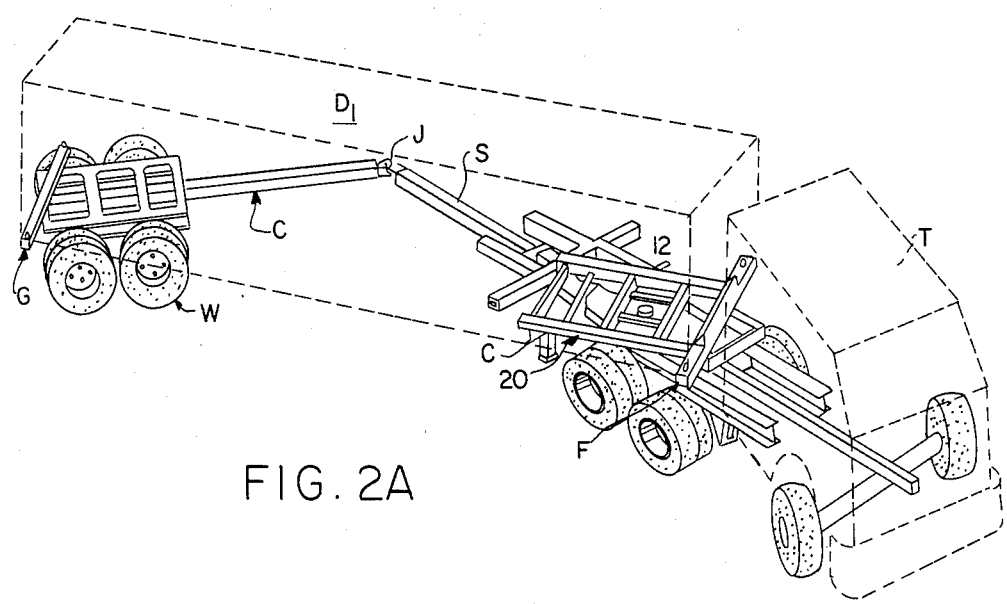

Having set forth the bolster lock L1 of FIG. 1B, attention may now be devoted to the configuration of the chassis of this invention illustrated in FIG. 2A.

Referring to FIG. 2A, container D has been replaced with container D1. Container D1 is a longer container typically being in the range of 45 to 48 feet. In order to accommodate the container, chassis C is telescoped so that articulating stinger S exposes articulation joint J.

It will be seen that chassis C at fifth wheel engagement portion 20 is locked to move rigidly with the frame of towing tractor T. This movement causes joint J to articulate out and to the side of container D1.

Further, it will be seen that forward bolster F and rearward bolster G both pivot. Forward bolster F pivots with respect to the fifth wheel engaging portion of chassis 20. Rear bolster G pivots with respect to rear wheels W.

An articulation results in which the rear wheel set W assists in turning tractor T and the overlong container D1 corners may be easily negotiated as set forth in my U.S. Pat. No. 4,660,848. Since the stinger S and joint J are therein completely described. I will now proceed to the description of the lock mechanism in the configuration of FIG. 2B.

Figure 2B:
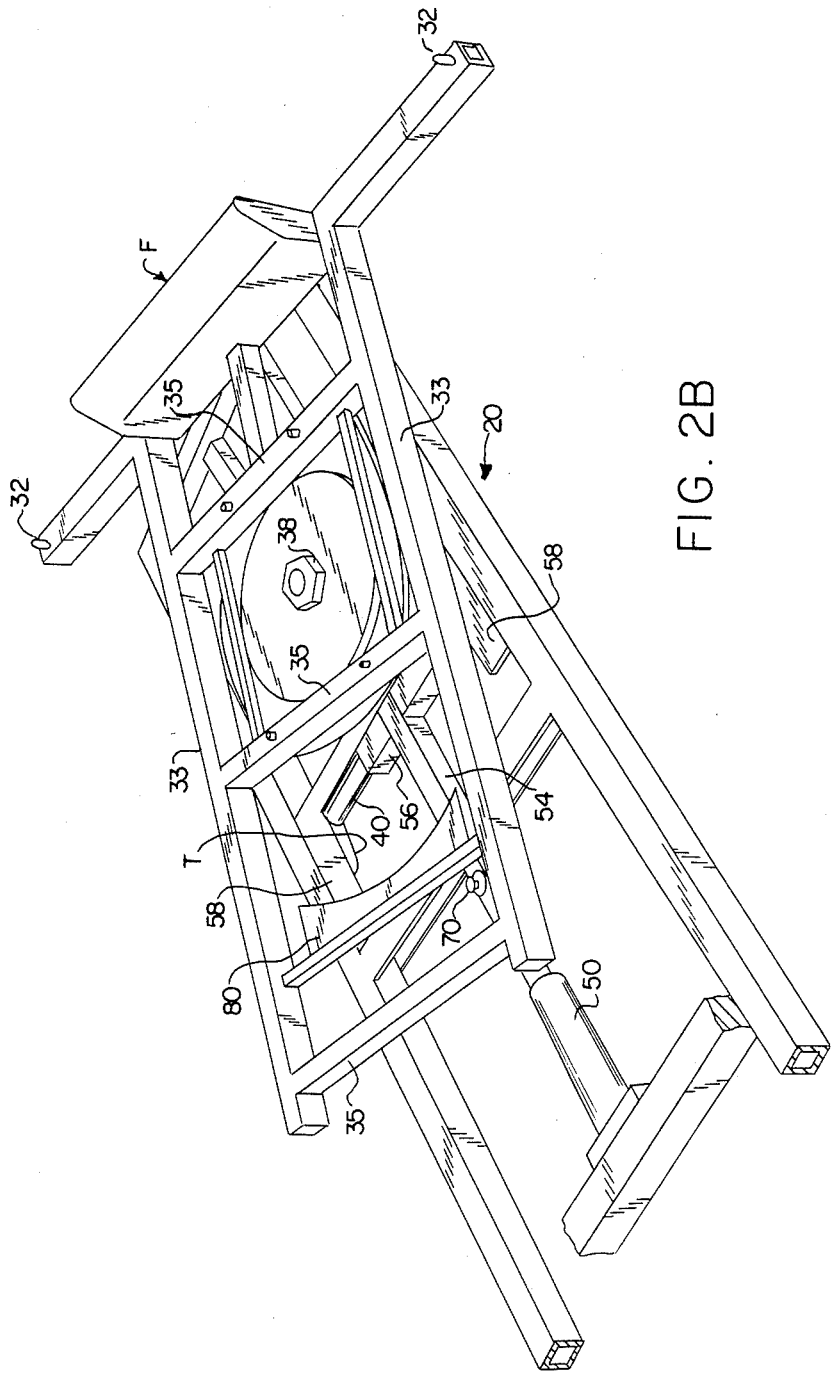
FIG. 2B is a view of the bolster and fifth wheel engagement portion of the chassis with the bolster lock disengaged; and, FIG. 2C is a view of the apparatus of FIG. 2B from underneath illustrating engagement of the fifth wheel lock.

Referring to FIG. 2B, cylinder 50 has caused bar 54 to move to a forward position. Bar 54 has in turn caused member 56 and cross bar 40 to likewise forwardly move. Tines T have been urged against plate 58 and have pivoted forwardly and out of engagement with the sides of frame members 33 of bolster F. Consequently, bolster F is now free to pivot with respect to the chassis.

What remains to be understood is the fifth wheel lock L2 locking the fifth wheel engaging portion 20 of the chassis C to the fifth wheel 60 at the pin gathering groove 62 on towing tractor T. This may best be seen with respect to FIG. 2C.

Figure 2C:
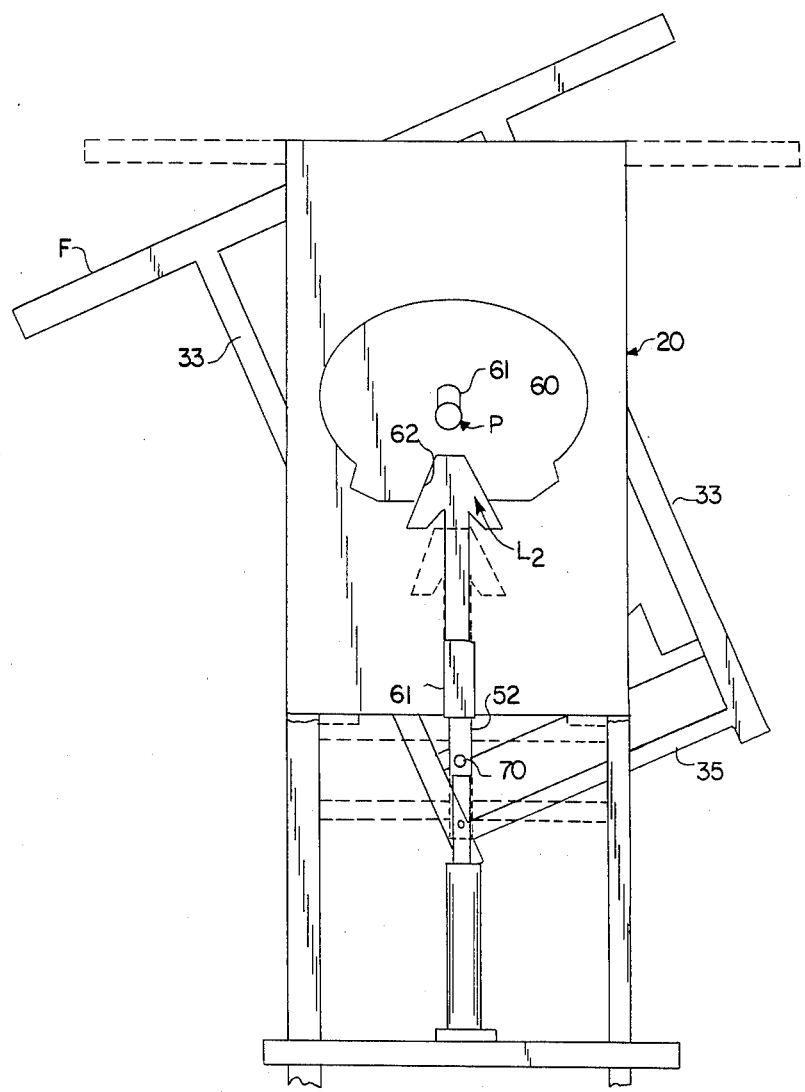

In FIG. 2C, for clarity of understanding I have taken the liberty to illustrate the underside of a standard fifth wheel 60. The reader will understand that fifth wheel 60 is rigidly attached to the towing tractor T.

Standard fifth wheel 60 includes a pin engaging groove 61 and has a pin gathering groove 62. Thus, when a tractor T backs with respect to a chassis, groove 62 gathers the pin P until the pin falls into groove 61. This is the familiar and notorious prior art truck trailer connection used throughout the trucking industry.

I have configured a lock L2 for engagement with this pin gathering groove. Lock L2 is a male member having the profile of the female pin gathering grove 62. Lock L2 attaches to the forward and leading edge of bar 52. Bar 52 is mounted for relative movement with respect to fifth wheel engaging portion 20 of the chassis at a sleeve 61.

It can be seen that when lock L2 is in the forward extended position that fifth wheel 60 will be locked relative to locking mechanism L2. Since the fifth wheel is rigidly affixed to the tractor, the fifth wheel engaging portion 20 of chassis C will likewise be rigidly engaged with respect to the tractor.

Understanding the locking mechanism L1 and L2, their co-action together is simply stated. Specifically. and as illustrated in FIGS. 1B, 2B. and 2C, a pin 70 connects the members together. Pin 70 provides the necessary interaction between the bolster lock L1 and the fifth wheel lock L2.

Referring to FIGS. 1B and 2C and to the locking mechanism L2 in the position shown in broken lines. it can be seen that when members 52, 54 are withdrawn by cylinder 50, fifth wheel lock L2 withdraws from fifth wheel 60. At the same time, tines T extend upwardly and engage the sides of members 33. Bolster F is rigidly engaged to fifth wheel engaging portion 20 of the chassis C.

Now referring to FIGS. 2B and 2C, cylinder 50 has forced members 52, 54 forwardly. Tines T have pivoted out of engagement with bolster F. At the same time, and referring to FIG. 2C, lock L2 has been thrust into engagement with the pin gathering surface 62 on fifth wheel 60. The chassis engaging portion 20 and the towing tractor T are locked together.

Referring to FIG. 2B, it could be understood that if cylinder 50 were to withdraw lock L2 from engagement with the fifth wheel, tines T might rotate into a position of interference with the angularly turned bolster F. To prevent this occurrence, a keeper plate 80 is added to bolster F. Keeper plate 80 interferes with one or the other of the tines T when bolster F is turned with respect to fifth wheel engaging portion 20 of the chassis. Thus, keeper plate 80 prevents inadvertent locking of the bolster F at any other angle than in forward parallel relation to the fifth wheel engaging portion of the chassis 20.

The reader will appreciate that this invention will admit of modification. For example, I have disclosed an air cylinder for effecting movement of the respective locking mechanisms L1, L2. Other mechanisms could as well be used.

I claim:

1. A lock for engaging a fifth wheel to a chassis wherein the fifth wheel is of the type having a female pin gathering groove for gathering a fifth wheel engaging pin on said chassis to the fifth wheel on a towing tractor, the lock comprising:
    a male locking member having a male configuration for cooperative locking engagement with said female pin gathering groove;
    means for moving said male locking member on said chassis into and out of engagement with respect to said female pin gathering groove on said fifth wheel when said pin on said chassis engages said fifth wheel, said means for moving attached on the forward portion of said chassis adjacent said fifth wheel whereby said forward portion of said chassis can be attached to said fifth wheel to prevent rotation of said forward portion of said chassis with respect to said fifth wheel;
    a bolster pivotally mounted overlying said fifth wheel and including further a locking member extending between said chassis and said bolster;
    means for locking said bolster to said chassis operatively connected to said means for moving said male locking member;
    said bolster locking means locking said bolster when said male member is out of engagement with respect to said female pin gathering groove on said fifth wheel and unlocking said bolster when said female pin gathering groove on said fifth wheel is engaged by said locking member.

2. The lock according to claim 1 and wherein said means for moving said male locking member comprises an air cylinder.

3. A locking mechanism for a chassis of the type having a forward chassis portion, a forward bolster pivotally mounted to said forward chassis portion, said bolster mounted for supporting the forward part of a container hauled on said chassis; a rearward chassis portion; a rearward bolster pivotally mounted to the rearward portion of said chassis for supporting the rearward part of a chassis hauled on said chassis; a wheel set affixed to said rearward portion of said chassis; and a telescoping and articulated stinger connecting said forward portion of said chassis and said rearward portion of said chassis, said stinger when telescoped to a first position having an articulated joint enabling said rear wheel set to assist in steering of said chassis; and said stinger when telescoped to a second disposition locking said articulating portion of said stinger from articulation whereby said chassis may be conventionally towed, the improvement comprising:
    a lock for engaging a fifth wheel of said towing tractor wherein said fifth wheel is of the type having a female pin gathering groove for gathering a fifth wheel engaging pin on said chassis to the fifth wheel on said towing tractor, said lock including a male locking member having a male configuration for cooperative locking engagement with said female pin gathering groove;
    and means for moving said male locking member on said chassis into and out of engagement with respect to said female pin gathering groove on said fifth wheel, said means for moving attached on said chassis whereby said forward portion of said chassis can be attached to said fifth wheel to prevent rotation of the forward portion of said chassis relative to said towing tractor at said fifth wheel and cause steering of said rear wheel set;
    a lock mounted to said chassis for locking said forward bolster in parallel relation to said chassis;
    said lock operatively connected to said means for moving said male locking member, said operative connection locking said bolster with respect to said chassis when said locking member is out of engagement with said female pin gathering groove on said fifth wheel and said bolster lock open to permit pivotal movement of said bolster when said locking member is in engagement with said female pin gathering groove on said fifth wheel.

4. The locking mechanism of said claim 3 and wherein said means for moving comprise an air cylinder.

5. A chassis including;
    a forward chassis portion;
    a forward bolster pivotally mounted to said forward chassis portion, said forward bolster for supporting the forward part of a container;
    a rearward chassis portion;
    a wheel set attached to said rearward portion of said chassis;
    a rearward bolster pivotally mounted to the rearward portion of said chassis;
    a telescoping and articulated stinger connected rearward portion of said chassis; said stinger when telescope between said forward portion of said chassis and said d to a first position having an articulating joint enabling said rear wheel set to assist in steering of said chassis, and said stinger when telescoped to a second position locking said articulating portion of said stinger from articulation whereby said chassis may be conventionally towed;
    a lock for engaging a fifth wheel of said towing tractor whereby said fifth wheel is of the type having female pin gathering groove for gathering a fifth wheel engaging pin on said chassis to the fifth wheel of said towed tractor, said lock including a male locking member having a male configuration for cooperative locking engagement with said female pin gathering groove;
    means for moving said male locking member on said chassis into and out of engagement with respect to said female pin gathering groove on said fifth wheel whereby said forward portion of said chassis can be selectively attached to turn with said tractor through a connection at said fifth wheel to prevent rotation of the forward portion of said chassis relative to said towing tractor and cause steering of said rear wheel set; and,
    means for locking said forward bolster relative to said chassis in parallel relation to said chassis.

6. The invention of claim 5 and wherein said bolster lock includes paired tines; first and second surfaces for engagement by said tines whereby said tines can move from said chassis into a locking position relative to said bolster.

7. The trailer according to claim 5 and including a plate fastened to said bolster, said plate positioned to obstruct the movement of one or the other of said tines in all positions of relative rotation of said bolster with respect to said chassis save and except parallel alignment between said bolster and said chassis.

* * * * *